United States Patent [19]

Ruch et al.

[11] Patent Number: 5,919,857
[45] Date of Patent: Jul. 6, 1999

[54] PLASTISOL COMPOSITION

[75] Inventors: Klaus Ruch, Wiesloch; Ingolf Scheffler, Rauenberg, both of Germany

[73] Assignee: Teroson GmbH, Heidelberg, Germany

[21] Appl. No.: 08/835,171

[22] Filed: Apr. 7, 1997

Related U.S. Application Data

[62] Division of application No. 08/601,542, Feb. 14, 1996, Pat. No. 5,668,209, which is a continuation of application No. 08/384,633, Feb. 6, 1995, abandoned, which is a continuation of application No. 08/050,134, filed as application No. PCT/EP91/02070, Oct. 31, 1991.

[30] Foreign Application Priority Data

Oct. 31, 1990 [DE] Germany .......................... 40 34 725.7

[51] Int. Cl.⁶ ...................................... C08L 25/08
[52] U.S. Cl. .......................... 524/555; 524/556; 524/560; 524/561; 524/571; 524/577; 524/904
[58] Field of Search ..................... 524/555, 556, 524/560, 561, 571, 577, 904; 427/388.1, 384, 374.4, 372.2, 195, 207.1; 428/516, 462

[56] References Cited

U.S. PATENT DOCUMENTS

| 4,199,486 | 4/1980 | Boessler et al. | 525/309 |
| 4,210,567 | 7/1980 | Kosters | 524/290 |
| 4,387,830 | 6/1983 | Kitamura et al. | 220/456 |
| 4,613,639 | 9/1986 | Blum et al. | 524/251 |
| 4,957,955 | 9/1990 | Saur et al. | 524/114 |

*Primary Examiner*—Mark L. Warzel
*Attorney, Agent, or Firm*—Ernest G. Szoke; Wayne C. Jaeschke; Real J. Grandmaison

[57] ABSTRACT

A plastisol composition based on styrene copolymers, plasticizers and inorganic fillers contains, as styrene copolymers, copolymers which can be produced by emulsion polymerization and contain a) styrene and/or α-methyl styrene and/or p-methyl styrene and b) 3 to 20 wt.-% (relative to the copolymer) methacrylic acid and/or acrylic acid and/or itaconic acid. To increase the abrasion resistance, further crosslinkers or strengtheners can be added. The plastisols are suitable for use in motor vehicle construction as underseal material, as an adhesive for hood lining, as a compound for grille protection or as a spot-welding paste, and in the packaging products industry as a sealing compound for container closures or as a seam seal or as a flange-joint adhesive for tin cans.

13 Claims, No Drawings

PLASTISOL COMPOSITION

This application is a division of application Ser. No. 08/601,542, filed Feb. 14, 1996, now U.S. Pat. No. 5,668,209, which is a continuation of Ser. No. 08/384,633, filed Feb. 6, 1995, now abandoned, which is a continuation of Ser. No. 08/050,134, filed Jun. 30, 1993, now abandoned, and which was filed as PCT/EP91/02070, Oct. 31, 1991, and published as WO92/07906, May 14, 1992.

BACKGROUND OF THE INVENTION

Field of the Invention

The invention relates to a novel plastisol composition based on styrene copolymers, plasticizers and inorganic fillers and also, where appropriate, other normal additions.

The term plastisols is understood to refer generally to dispersions of organic plastics in plasticizers which gel when heated to a higher temperature and harden upon cooling. The plastisols which are still customary in practice today quite predominantly contain finely powdered polyvinyl chloride (PVC) which is dispersed in a liquid plasticizer and forms a paste. Such polyvinyl chloride plastisols are used for many different purposes. They are used inter alia as sealing compounds, e.g. for seam seals in metal containers or as flange-joint adhesives in the metal industry, as corrosion-protection coverings for metals (for example as undersealing for motor vehicles), for the impregnation and coating of substrates made from textile materials (e.g. as carpet-back coatings), as cable insulation etc.

However, a series of problems occur during the production and use of PVC plastisols. The production of PVC itself is not without problems, because those who work in the production sites are exposed to a health risk from the vinyl chloride monomer. Residues of vinyl chloride monomer in the PVC could also pose a threat to health during further processing or to end-users, although the contents are generally only in the ppb range.

What is particularly serious when using PVC plastisols is that PVC is both heat- and light-sensitive and tends towards the splitting-off of hydrogen chloride. This represents a serious problem especially when the plastisol must be heated to a higher temperature, as the hydrogen chloride released under these conditions has a corrosive action and attacks metallic substrates. This is particularly true if, to shorten the gelation time, relatively high stoving temperatures are used or if, as during spot welding, locally high temperatures occur.

The greatest problem occurs when disposing of PVC-containing waste: dioxins, which are known to be highly toxic, can occur under certain circumstances in addition to hydrogen chloride. In conjunction with steel scrap, PVC residues can lead to an increase in the chloride content of the steel melt, which is likewise disadvantageous.

It is therefore the object of the invention to develop a polyvinyl chloride-free plastisol composition whose application properties correspond to those of PVC plastisols.

Polyurethane- or acrylate-based plastisols have already become known. Two-component polyurethane systems differ fundamentally from normal plastisols in use, the complicated plant needed to process them not, as a rule, being available to users. Single-component polyurethane systems are not sufficiently storage-stable. Attempts to deal with this drawback by encapsulating the isocyanates are very expensive, so that these products cannot then compete with PVC plastisols in terms of cost. Nor is the abrasion resistance sufficient for many applications, e.g. as undersealing for motor vehicles.

DISCUSSION OF RELATED ART

Acrylatplastisols, such as have become known through DE-B-24 54 235 and DE-B-25 29 732, largely satisfy the technical requirements mentioned initially, but the necessary acrylate polymers are much more expensive than polyvinyl chloride, so that the use of such acrylate plastisols has hitherto remained limited to special application fields, for example as spot-welding pastes, in which PVC plastisols fail totally. Plastisols based on styrene/acrylonitrile copolymers according to EP-A-261 499 likewise still fail to provide a satisfactory solution, because of their inadequate abrasion resistance and storage stability.

EP-A-265 371 describes plastisols comprising a dispersion of carboxyl group-containing, finely dispersed polymers, which are reacted with multifunctional basic substances, in plasticizers. Copolymers of any monomers with polymerizable acids, e.g. copolymers of vinyl chloride, vinylidene chloride, acrylates, methacrylates, maleinates, styrene, methyl styrene, vinyl esters, vinyl ethers, acrylonitrile, olefins or dienes with acids such as acrylic acid, methacrylic acid, itaconic acid, crotonic acid, maleic acid or fumaric acid, are used as polymers. These copolymers are reacted with basic substances such as basic metal compounds of polyvalent metals, at least bifunctional amine compounds and others. In practical use, these plastisols cannot satisfy; the mechanical properties (elasticity or elongation at break) are inadequate. There is also a marked tendency towards discoloration and, when polyfunctional amines are added, large-pored blistering occurs upon gelation.

DESCRIPTION OF THE INVENTION

It was found that plastisol compositions with excellent application properties, in particular good storage-stability, good adhesion on metals and high abrasion resistance and excellent mechanical properties can be obtained by using, as organic polymer component, styrene copolymer powders which can be produced by emulsion polymerization and which contain a) styrene and/or α-methyl styrene and/or p-methyl styrene and b) 3 to 20 wt.-% (relative to the copolymer) methacrylic acid and/or acrylic acid and/or itaconic acid.

It transpired that, during the emulsion polymerization of these styrene copolymers, polymer particles with a very uniform average primary particle size of ca. 0.3 to 1.5 μm can be obtained in which the polar carboxyl groups are arranged essentially outside and, as lipophobic radicals, are clearly responsible for the stability of the dispersions of these particles in the plasticizer at room temperature. Where appropriate, the polymerization process can be guided so that a bimodal distribution of the primary particle size is achieved. This version is particularly desirable if, despite a high polymer content in the plastisol composition, a low viscosity is to be achieved. Upon heating to higher temperatures for the gelation of the plastisol, the plasticizer on the other hand penetrates the styrene nucleus and leads to gelation of the plastisol. The use of methacrylate-based nucleus/shell copolymers is already described in DE-B 25 43 542, DE-B-27 22 752 and DE-B-29 49 954, but it is novel and surprising that copolymers comprising styrene and a subordinate quantity of methacrylic acid or acrylic acid (hereinafter called "(meth)-acrylic acid" for short) form such polymer powders from which particularly advantageous plastisol compositions can be produced.

The copolymers used according to the invention have a molecular weight of the order of 200,000 to 1,000,000 and contain, as well as styrene, α-methyl styrene and/or p-methyl styrene, 3 to 20 wt.-%, preferably ca. 5 to 10 wt.-% (meth)acrylic acid and/or itaconic acid. The storage stability of the plastisols increases with the (meth)acrylic acid and/or itaconic acid content. Because of the free carboxyl groups the plastisols also display outstanding adhesion on metal (e.g. steel or zinc) substrates or on cataphoretic electro-dip varnishes. However, the (meth)acrylic acid and/or itaconic acid content of the copolymer is not to exceed 20 wt.-% and preferably ca. 10%, because then the abrasion resistance of the plastigel decreases. Up to 80 wt.-% of comonomer component b) ((meth)acrylic acid and/or itaconic acid) can be replaced by methyl(meth)acrylate, (meth)acrylamide and/or glycidyl(meth)acrylate.

To increase the flexibility and thus the abrasion resistance of the plastigel produced from the plastisol composition according to the invention, styrene component a) of the copolymer can contain up to 45, in particular up to 20, wt.-% (relative to the styrene) of butadiene, isoprene, piperylene and/or of another rubber-forming comonomer.

As already stated above, the average primary particle size of the copolymer powder lies between ca. 0.3 and 1.5 μm, which can be achieved through appropriate control of the emulsion polymerization. The agglomerates formed from the primary particles have an average secondary particle size of less than 100 μm, preferably ca. 20 to 60 μm.

According to the invention it is also possible to further improve properties of the plastigel, especially the abrasion resistance, by adding to the plastisol up to 40 wt.-% of a compound reacting with the carboxyl groups of the copolymer at the gelation temperature, accompanied by crosslinking. For a reaction with the carboxyl groups present, long-chained epoxy compounds, epoxidized polybutadienes or even epoxidized natural oils such as epoxidized soybean oil come particularly into consideration. Also suitable are di- or polyhydroxy-functional polyethylene and/or polypropylene glycols. Liquid hydroxy-functional polybutadienes or mercaptan-terminated liquid polymers can also be used instead of or in combination with the polypropylene glycols mentioned above. The formation of ester bonds between these compounds and the carboxyl groups of the styrene copolymer generally already takes place upon heating of the plastisol to the gelation temperature. Where appropriate, however, suitable catalysts can be added in a quantity of ca. 0.01 to 2.0 wt.-%, e.g. imidazole or substituted imidazoles such as N-alkyl imidazoles, e.g. N-methyl imidazole, tert. amines, tetramethylenediamine or urea derivatives. Alkylbenzene sulphonic acids and titanates are also suitable as catalysts for the ester formation with glycols.

If the styrene copolymer contains small quantities of glycidyl-(meth)acrylate as comonomer, then di- or polyamines, di- or polycarboxylic acids or mercapto compounds can be added to the plastisol as compounds crosslinking with the epoxide groups.

Another possibility for improving the mechanical properties of the plastigels is to dissolve polyurethane formers in the plasticizer in the form of isocyanate prepolymers and aliphatic or cycloaliphatic diamines. The isocyanate prepolymers contain preferably blocked isocyanate groups, e.g. isocyanate groups blocked by caprolactam, or are present in the form of solid, microencapsulated isocyanate prepolymers as a dispersion in the liquid phase. These isocyanate prepolymers can be present in a quantity of up to 30 wt.-% of the total formulation, and the (cyclo)aliphatic diamines can account for up to 5 wt.-% of the total formulation in the case of low-molecular-weight amines (up to a molecular weight of ca. 500), and up to 30 wt.-% in the case of higher-molecular-weight diamines. Upon heating to the gelation temperature, a polyurethane formation occurs, with an IPN (inter-penetrating polymer network) structure possibly forming with the styrene copolymer present in dispersed form.

The following improvements in properties are achieved through the reactive additions:

Temperature stability and high-temperature dimensional stability are decisively improved by the crosslinking, the soft segments of the polyethers bring about a flexibilization and greater extensibility and also a clear improvement in the abrasion resistance of the plastisols according to the invention after gelation, the properties can be changed within wide limits by varying the reactive additions, without having to produce many different styrene copolymers separately to do so, low-temperature flexibility is decisively improved, compatibility with the favourably-priced standard commercial phthalate plasticizers, e.g. dioctyl phthalate, diisononyl phthalate, dihectyl phthalate and similar, is greatly improved.

The plastisol composition contains ca. 30 to 1000 parts by weight plasticizer per 100 parts by weight of the styrene copolymer. The conventional organic plasticizers are suitable per se as plasticizers (cf. Paul E. Bruins, Plasticizer Technology [Weinhold Publishing Corporation, New York], Vol. 1, pp. 228 to 232). Preferred are alkyl phthalates such as dibutyl phthalate, dioctyl phthalate, butyl benzyl phthalate, dibenzyl phthalate and quite particularly diisononyl phthalate. However, the known plasticizers from the group of organic phosphates, adipates and sebacates or even benzyl benzoate or diphenyl ether are also suitable.

Production of the styrene copolymers used according to the invention is by polymerization in emulsion, using the so-called seed latex process. Firstly, a seed latex is produced in aqueous phase using suitable emulsifiers and placed in the receiver, whereupon the monomers and, where appropriate, further emulsifier are added to it. In this way the desired average particle size can be established relatively precisely. Another result is that the hydrophilic radicals, especially the carboxyl groups, align themselves outwards to the aqueous phase, so that the desired nucleus/shell structure is achieved. However, it is also possible, optionally, to polymerize mainly the styrene component first and not add the comonomer until the later stage of polymerization; this procedure is recommended particularly if the comonomers have less polar radicals, e.g. ester groups.

The thus-obtained dispersions are then converted into a dry powder, for which spray-drying is specially suited if the temperature conditions are so chosen that the primary particles do not sinter together but merely form loose agglomerates.

The plastisols according to the invention are suitable in motor vehicle construction, especially as underseal material, and also as adhesives for hood lining, as materials for grille protection and as spot-welding pastes. In the packaging industry, they can be used to advantage as sealing compounds for container closures such as crown corks, and also as seam seals and flange-joint adhesives for tin cans.

The following examples are intended to explain the invention in detail:

EXAMPLE 1

Production of the Copolymer

The following components were used:

| | | | |
|---|---|---|---|
| Introduced first | Water | 263.8 g | 25.41% |
| | Seed latex | 27.3 g | 2.63% |
| | Texapon ® K 12 | 0.1 g | 0.01% |
| | Isoascorbic acid | 0.3 g | 0.03% |
| Monomers | Styrene | 462.5 g | 44.55% |
| | Methacrylic acid | 37.5 g | 3.61% |
| Emulsifiers | Water | 190.0 g | 18.30% |
| | Texapon ® K 12 | 3.7 g | 0.35% |
| | Isoascorbic acid | 1.0 g | 0.10% |
| Initiator I | t-butylhydroperoxide | 1.0 g | 0.10% |
| Initiator II | Water | 50.0 g | 4.82% |
| | t-butylhydroperoxide | 0.6 g | 0.06% |
| | Texapon ® K 12 | 0.1 g | 0.001% |
| Initiator III | t-butylhydroperoxide | 0.3 g | 0.003% |
| | | 1038.2 g | 100.00% |

In a reaction vessel with anchor agitator, inside thermometer, nitrogen feed, vacuum connection, reflux cooler and three sealed dropping funnels in a heatable water bath, the seed latex was introduced first in water with the emulsifier (sodium lauryl sulphate, Texapon® K12, Henkel) and isoascorbic acid. Demineralized water freed from atmospheric oxygen was used. The whole apparatus was thoroughly flushed with nitrogen and a slow nitrogen flow was passed through the apparatus during polymerization.

After the receiver had been heated to 75° C., 1 g of t-butyl hydroperoxide was added as Initiator I. The regular feed of monomer, emulsifier and Initiator II then began over a period of 4 hours. During the addition, the temperature is regulated so that it does not exceed 85–90° C. The stirring speed must not be too high, but the monomers must be adequately dispersed in the aqueous phase.

After the three components have been fed in, stirring continues for another hour at 75° C. Initiator III is then added. After further stirring during 2 hours at 75° C., the dispersion is cooled and drained accompanied by screening, with only a small quantity of coagulate remaining on the screen.

To obtain a polymer powder suitable for plastisol production, the dispersion is spray-dried, the parameters chosen in each case depending on the system used. The following conditions were used:

Air inlet temperature: 180–200° C.

Air outlet temperature: 80–85° C.

Agglomerate particle size of the dried powder: 35±5 μm.

EXAMPLE 2

Production of a Plastisol

A plastisol was produced from the following components:

| | |
|---|---|
| Polymer powder as per Example 1: | 100 parts |
| Diisononyl phthalate (plasticizer): | 100 parts |
| Barium sulphate: | 100 parts |
| Carbon black: | 3 parts |

A plastisol was obtained which was excellently suitable as undersealing for motor vehicles.

EXAMPLE 3

A plastisol was produced from the following components:

| | |
|---|---|
| Polymer powder as per Example 1: | 100 parts |
| Diisononyl phthalate (plasticizer): | 152 parts |
| Calcium carbonate: | 225 parts |
| Titanium dioxide: | 3 parts |
| Adhesion promoter: | 2 parts |
| Azodicarbonamide (swelling agent): | 3 parts |
| Hexane (viscosity reducer): | 15 parts. |

A plastisol was obtained which was outstandingly suitable as a sealing compound for container closures (crown corks).

EXAMPLE 4

A plastisol was produced from the following components:

| | |
|---|---|
| Polymer powder as per Example 1: | 100 parts |
| Diisononyl phthalate: | 100 parts |

After stoving of a 1000 μm-thick layer at 150° C./30 min. an abrasion time of 44 sec. was measured.

EXAMPLE 5

A plastisol was produced from the following components:

| | |
|---|---|
| Polymer powder as per Example 1: | 100 parts |
| Diisononyl phthalate: | 100 parts |
| Monofunctional epoxide: | 2 parts |

After stoving as in Example 4, an abrasion time of 1 min. was found for a layer thickness of 850 μm.

EXAMPLE 6

| | |
|---|---|
| Polymer powder as per Example 1: | 100 parts |
| Diisononyl phthalate: | 100 parts |
| Trifunct. polypropylene glycol (MW 3000): | 10 parts |
| Methylimidazole: | 0.3 parts |

After stoving as in Example 4, an abrasion time of 4 min. 58 sec. was found for a layer thickness of 750 μm.

EXAMPLE 7

A plastisol was produced from the following components:

| | |
|---|---|
| Polymer powder as per Example 1: | 200 parts |
| Diisononyl phthalate (plasticizer): | 200 parts |
| Encapsulated polyurethane prepolymer | 100 parts |
| Cycloaliphatic diamine | 10 parts |
| Calcium carbonate (ground chalk): | 200 parts |
| Calcium oxide: | 40 parts |

EXAMPLE 8

Comparative Example

Three plastisol formulations were produced from the following components in accordance with EP-A-265 371. The plastisols were then knife-coated in a ca. 2-mm thick layer onto a cataphoretically varnished steel sheet and burnt for 30 min at 150° C. in the oven. The compositions of the three plastisols, and also their properties, are shown in the following table.

| Test | A | B | C |
|---|---|---|---|
| Polymer powder as per Example 1 | 350 parts | 350 parts | 350 parts |
| Diisononyl phthalate (plasticizer) | 350 parts | 350 parts | 350 parts |
| Calcium carbonate (ground chalk) | 350 parts | 350 parts | 350 parts |
| Calcium oxide (drying agent) | 10 parts | 10 parts | 10 parts |
| Mixture of high-boiling isoparaffins (viscosity regulators) | 30 parts | 30 parts | 30 parts |
| Ethylene diamine | — | 20 parts | — |
| Diethylene triamine | — | — | 20 parts |
| Adhesion | very good | good | good |
| Elastic properties | viscoelastic | brittle | brittle |
| Appearance | no discoloration, closed film | marked yellowing, large-pored blistering | marked yellowing, large-pored blistering |

Comparative example A is an example according to the invention, while comparative examples B and C contain a polyfunctional amine according to EP-A-265 371. It is clear that a film very well suited as undersealing is obtained from the plastisol according to the invention, whereas, because of their marked embrittlement, marked yellowing and, quite particularly, because of the large-pored blistering, the films of comparative examples B and C are unsuitable as undersealing.

EXAMPLE 9

Comparative Example

Plastisol formulations were produced from the following components. The plastisols were then poured into a mould and stoved for 30 min at 150° C., so that 2 mm-thick films were obtained which were subjected to the tensile test according to DIN 53504 in the form of S 1 shoulder rods.

| Test | D | E |
|---|---|---|
| Polymer powder as per Example 1 | 300 parts | 300 parts |
| Diisononyl phthalate (plasticizer) | 390 parts | 390 parts |
| Calcium carbonate (ground chalk) | 300 parts | 290 parts |
| Calcium oxide (drying agent) | 10 parts | 10 parts |
| Zinc oxide | — | 10 parts |
| Tensile strength (N/cm$^2$) | 152 | 154 |
| Elongation (%) | 217 | 16 |
| Shore A hardness | 76 | 78 |

The test D composition is again according to the invention, while the test E composition differs from that of test D by virtue of the addition of zinc oxide (as per EP-A-265 371). It is clear that the addition of zinc oxide reduces the elongation at break of the plastisol by orders of magnitude, so that such a plastisol is completely unusable for underseal applications.

EXAMPLE 10

Comparative Example

A polymer powder with the following monomer composition was snthesized and spray-dried according to the procedure of Example 1 and in accordance with EP-A-265 371:

| | |
|---|---|
| Styrene | 277.5 g |
| Acrylonitrile | 185.0 g |
| Methacrylic acid | 37.5 g |

With this polymer powder, a plastisol formulation as per test A Example 8 was produced and stoved for 30 min at 150° C. in the oven. The result was a very brittle and friable plastisol out of which the plasticizer sweated after a short time. Such a plastisol is completely unsuitable for underseal applications.

EXAMPLES 11 and 12

Plastisols were produced from the following components.

| Example no. | 11 | 12 |
|---|---|---|
| Polymer powder as per Example 1 | 30 | 30 |
| Diisononyl phthalate (plasticizer) | 40 | 36 |
| Linear glycidyl derivative (mol. wt. ca. 2600)[1] | 5.8 | — |
| Branched glycidyl derivative (mol. wt. ca. 4800)[2] | — | 5.0 |
| Calcium carbonate (ground chalk) | 10.0 | — |
| Hiqhly-dispersed silicic acid | 0.5 | 1.5 |
| Heavy spar | 7.7 | 18.4 |
| Calcium oxide | 1.0 | 1.0 |
| DGBA[3] | — | 1.0 |
| 2 methyl-4-ethylimidazole | — | 0.1 |
| Isoparaffin mixture | 5.0 | 7.0 |
| Tensile strength (N/cm$^2$)[4] | 41 | 148 |
| Elongation (%) | 458 | 390 |
| Abrasion time (min)[5] | 8 | 7:30 |

[1] Conversion product of a polyurethane polymer comprising a linear polypropylene glycol and toluylene diisocyanate with glycidol.
[2] Conversion product of a polyurethane polymer comprising trifunctional polypropylene glycol and toluylene diisocyanate with glycidol.
[3] Diglycidyl ether of bisphenol A.
[4] S 1 shoulder rods according to DIN 53504 punched out from a 2 mm-thick plastisol film (stoving conditions: 30 min at 150° C.).
[5] Coating of cataphoretically varnished steel sheets with plastisol (layer thickness 800 μm), procedure otherwise as for Examples 4 to 7.

It is particularly clear from the Examples 11 and 12 according to the invention that, through a skilful selection of the additions to the plastisol, the mechanical properties, in particular the tensile strength, can be altered within wide limits without any significant deterioration in the elongation at break or abrasion time.

We claim:

1. A plastisol composition consisting essentially of a styrenic copolymer powder, said styrenic copolymer consisting of a styrene monomer selected from the group consisting of styrene, α-methyl styrene and p-methyl styrene, and from 3 to 20% by weight based on the weight of said styrenic copolymer, of a comonomer (b) selected from the group consisting of methacrylic acid, acrylic acid and itaconic acid, and optionally, up to 45% by weight, based on the weight of said styrenic copolymer, of a comonomer selected from the group consisting of butadiene, isoprene, and piperylene, and from 0.01 to 40% by weight, based on the weight of said plastisol, of a compound reactive with the carboxyl groups of said copolymer at the gelation temperature of said plastisol, accompanied by crosslinking thereof.

2. A plastic composition as in claim 1 wherein said compound reactive with said carboxyl groups of said copolymer is selected from the group consisting of epoxy compounds, epoxidized polybutadienes, di- and polyhydroxy-functional polyethylene and polypropylene glycols, hydroxy-functional polybutadienes, and mercaptan-terminated liquid polymers.

3. A plastisol composition as in claim 1 further containing a catalyst for the crosslinking reaction.

4. A plastisol composition as in claim 3 wherein said catalyst is selected from the group consisting of imidazoles, tertiary amines, tetramethylenediamine, urea compounds, alkyl benzene sulfonic acids, and titantates.

5. A plastisol composition as in claim 1 further containing glycidyl (meth) acrylate as a comonomer and a crosslinking compound selected from the group consisting of di- and polyamines, di- and polycarboxylic acids, and mercapto compounds.

6. A plastisol composition as in claim 1 further containing an inorganic filler and a polyurethane former dissolved in a plasticizer in the form of an isocyanate prepolymer and an aliphatic or cycloaliphatic diamine which react at the gelatin temperature of said plastisol.

7. A plastisol composition as in claim 6 wherein said isocyanate prepolymer contains blocked isocyanate groups.

8. A plastisol composition as in claim 6 wherein said isocyanate prepolymer is present in the amount of up to 30% by weight, based on the weight of said plastisol, and said diamine is present in the amount of up to 30% by weight, based on the weight of said plastisol.

9. A plastisol composition as in claim 6 wherein said plasticizer is present in an amount of from about 30 to 1,000 parts by weight per 100 parts by weight of said styrene copolymer, and said filler is present in an amount of up to 700 parts by weight per 100 parts by weight of said styrene copolymer.

10. The process of sealing a substrate comprising applying to said substrate a plastisol composition consisting essentially of a styrenic copolymer powder consisting of a styrene monomer selected from the group consisting of styrene, $\alpha$-methyl styrene and p-methyl styrene, and from 3 to 20% by weight, based on the weight of said styrenic copolymer, of a comonomer (b) selected from the group consisting of methacrylic acid, acrylic acid and itaconic acid; and optionally, up to 45% by weight, based on the weight of said styrenic copolymer, of a comonomer selected from the group consisting of butadiene, isoprene, and piperylene, and from 0.01 to 40% by weight, based on the weight of said plastisol, of a compound reactive with the carboxyl groups of said copolymer at the gelation temperature of said plastisol, accompanied by crosslinking thereof, heating said plastisol composition to its gelation temperature; and cooling said plastisol composition until it hardens.

11. A process as in claim 10 wherein said substrate comprises a motor vehicle part.

12. A process as in claim 10 wherein said substrate comprises a container closure.

13. A process as in claim 10 wherein said substrate is a metal.

* * * * *